V. H. WEBER.
FLY TRAP.
APPLICATION FILED MAY 24, 1915.
1,163,489.
Patented Dec. 7, 1915.
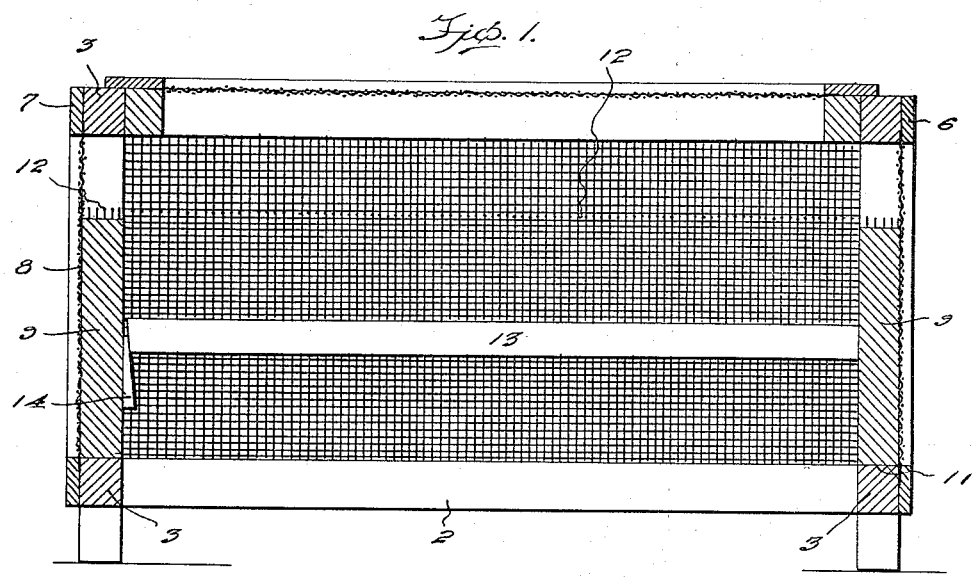
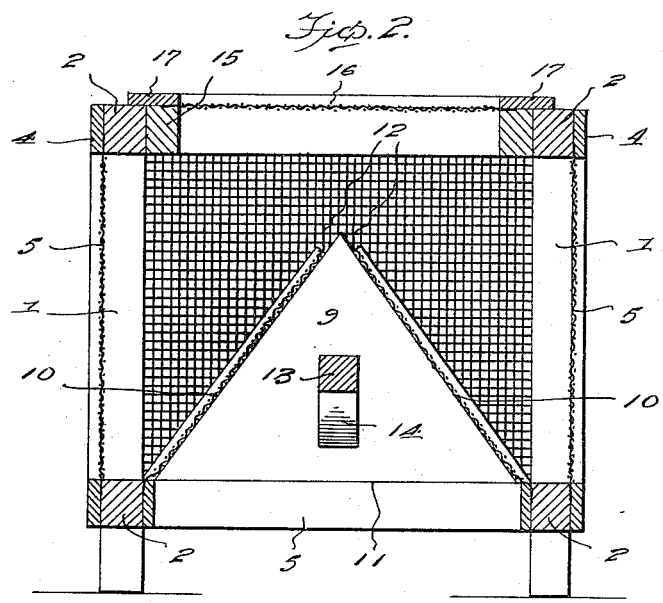
Witnesses
Inventor
V. H. Weber.
By _____ Attorney

UNITED STATES PATENT OFFICE.

VINCENT H. WEBER, OF DAYTON, OHIO.

FLY-TRAP.

1,163,489.             Specification of Letters Patent.        Patented Dec. 7, 1915.

Application filed May 24, 1915.   Serial No. 30,150.

*To all whom it may concern:*

Be it known that I, VINCENT H. WEBER, a citizen of the United States, residing at Dayton, in the county of Montgomery and State of Ohio, have invented certain new and useful Improvements in Fly-Traps; and I do hereby declare the following to be a full, clear, and exact description of the invention, such as will enable others skilled in the art to which it appertains to make and use the same.

This invention relates to fly traps, and one of the principal objects of the invention is to provide a fly trap of exceedingly simple construction in which efficient means are provided for adjusting the inlet opening for the flies to provide a narrow or a wide slot extending across the trap to permit the flies to enter.

The foregoing and other objects may be attained by means of the construction illustrated in the accompanying drawing, in which:

Figure 1 is a longitudinal sectional view of a fly trap made in accordance with this invention, and Fig. 2 is a transverse vertical section of the same.

Referring to the drawing, the numerals 1 designate the four corner posts and secured to the sides and ends of the frame, are side rails 2 at the top and bottom and end bars 3. Secured to the sides of the members 3 are frames 4 of rectangular form having wire screen material 5 secured thereto. At the ends of the trap frames 6 of rectangular form are provided and secured to the members 3 of the trap, said frame 7 being provided with screen material 8 secured thereto.

Secured within the rectangular trap, already described, are two triangular supports 9, having screen material 10 secured to the opposite sides thereof, while the base 11 rests upon the member 5. The upper ends of the screen material 10 are separated, as shown at 12, to form an opening between them for permitting the flies to enter the trap. In order to adjust this opening or slot a longitudinal bar 13 is provided, and at one end of said bar a wedge 14 is adapted to be driven between the end of the bar and the triangular member 9 to separate said members at their apex to thus draw the screen material 10 together to form a comparatively narrow slot. When the wedge 14 is removed the screen material will separate owing to the apices of the triangular members 9 being drawn one toward the other to loosen the wire fabric.

A removable cover 15 comprising a frame has screen material 16 secured thereto and said frame has outwardly extending flanges 17 to rest upon the members 2 when the cover is inserted in the rectangular opening at the top of the trap.

The corner posts or legs 1 extend below the trap proper so that the flies can enter underneath the same, lured by the bait which is placed upon the screen members 10 in the form of sugar moistened with vinegar, or other suitable material, the flies passing up the members 10 and into the opening between the two edges thereof.

Various changes may be made in the details of construction without departing from the spirit and scope of the invention as defined in the appended claim.

What I claim is:

In a fly trap the combination of a rectangular housing, and two triangular portions having wire cloth material connected to two opposite sides thereof, said wire cloth terminating short of the apices of the triangular member, and a bar extending between said members to hold them separated, and a wedge for insertion between the ends of the bar and one of the triangular portions to regulate the size of the entrance opening for the flies.

In testimony whereof I affix my signature in presence of two witnesses.

VINCENT H. WEBER.

Witnesses:
 CHAS. J. LACHEY,
 OSCAR HAVERMEHL.

Copies of this patent may be obtained for five cents each, by addressing the "Commissioner of Patents, Washington, D. C."